United States Patent
Hashimoto (10) Patent No.: US 11,484,812 B2
(45) Date of Patent: Nov. 1, 2022

(54) METHOD OF SEPARATING SOLID ELECTROLYTE AND CATHODE ACTIVE MATERIAL WHICH ARE CONTAINED IN SLURRY

(71) Applicant: TOYOTA JIDOSHA KABUSHIKI KAISHA, Toyota (JP)

(72) Inventor: Yuichi Hashimoto, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 16/790,571

(22) Filed: Feb. 13, 2020

(65) Prior Publication Data

US 2020/0269155 A1    Aug. 27, 2020

(30) Foreign Application Priority Data

Feb. 27, 2019    (JP) .............................. JP2019-034216

(51) Int. Cl.
| | | |
|---|---|---|
| B01D 11/02 | (2006.01) | |
| H01M 4/525 | (2010.01) | |
| H01M 4/62 | (2006.01) | |
| H01M 10/0562 | (2010.01) | |

(52) U.S. Cl.
CPC ......... B01D 11/0288 (2013.01); H01M 4/525 (2013.01); H01M 4/623 (2013.01); H01M 10/0562 (2013.01); H01M 2300/0068 (2013.01)

(58) Field of Classification Search
None
See application file for complete search history.

(56) References Cited

U.S. PATENT DOCUMENTS

| | | |
|---|---|---|
| 2012/0091391 A1 | 4/2012 | Tsuchida et al. |
| 2013/0142943 A1 | 6/2013 | Kubo et al. |
| 2018/0212282 A1 | 7/2018 | Lee et al. |

FOREIGN PATENT DOCUMENTS

| | | | |
|---|---|---|---|
| CN | 101919107 A | 12/2010 | |
| CN | 106848471 A | 6/2017 | |
| CN | 108448193 A | 8/2018 | |
| JP | 2013115022 A | 6/2013 | |
| JP | 2013118143 A | 6/2013 | |
| JP | 2016-58299 A | 4/2016 | |
| JP | 2016058299 A | * 4/2016 | ............ Y02W 30/84 |

OTHER PUBLICATIONS

Wikipedia of Carbon tetrabromide, 2022.*

* cited by examiner

*Primary Examiner* — Ula C Ruddock
*Assistant Examiner* — Tony S Chuo
(74) *Attorney, Agent, or Firm* — Dickinson Wright, PLLC (57) ABSTRACT

A method of easily separating a solid electrolyte and a cathode active material which are contained in a slurry is disclosed. The method of separating a solid electrolyte and a cathode active material which are contained in a slurry includes: adding a fluorine-based solvent to the slurry containing the solid electrolyte and the cathode active material, the cathode active material containing at least one selected from nickel, cobalt and manganese as a constituent element.

8 Claims, 7 Drawing Sheets

Fig. 5A  Fig. 5B  Fig. 5C  Fig. 5D binder　　VGCF　　LNCM　　LTO

Fig. 5E  Fig. 5F

VGCF
LNCM sulfide solid electrolyte

METHOD OF SEPARATING SOLID ELECTROLYTE AND CATHODE ACTIVE MATERIAL WHICH ARE CONTAINED IN SLURRY

RELATED APPLICATION

This application claims priority to Japanese Patent Application No. 2019-034216, filed on Feb. 27, 2019, including the specification, drawings and abstract, the entire disclosure of which is incorporated herein by reference.

FIELD

The present application discloses a method of separating a solid electrolyte and a cathode active material which are contained in a slurry, and the like.

BACKGROUND

Cathode mixture layers of all-solid-state batteries contain, for example, a solid electrolyte and a cathode active material, and may further contain a conductive additive and a binder. Such a cathode mixture layer may be formed by, for example, dispersing a solid electrolyte and a cathode active material in a solvent to obtain a slurry, and coating a cathode current collector or the like with the slurry to dry the coated collector (JP 2013-115022 A and JP 2013-118143 A).

SUMMARY

Technical Problem

A slurry containing a solid electrolyte and a cathode active material usually has a high solid content concentration and a high viscosity, which make it difficult for the slurry to be handled when remaining inside piping etc. It is necessary to efficiently separate one of highly dispersing solid electrolyte and cathode active material from a slurry having a high viscosity as described above for recycling valuable substances contained in a cathode active material, such as nickel, cobalt, and manganese. Here, some solid electrolyte has reactivity to a substance having a high polarity such as water, so as to be handled with care.

Solution to Problem

As one means for solving the problem, the present application discloses a method of separating the solid electrolyte and the cathode active material which are contained in a slurry, the method including: adding a fluorine-based solvent to the slurry containing a solid electrolyte and a cathode active material, the cathode active material containing at least one selected from nickel, cobalt and manganese as a constituent element.

In the method of the present disclosure, the fluorine-based solvent do not necessarily have a hydrocarbon group.

In the method of the present disclosure, the fluorine-based solvent may be a perfluoroalkane.

In the method of the present disclosure, the solid electrolyte may be a sulfide solid electrolyte.

In the method of the present disclosure, a phase of a solvent constituting the slurry and a phase of the fluorine-based solvent may be separated from each other, and the phase of the solvent constituting the slurry may be on a top side of the phase of the fluorine-based solvent in a stationary state.

In the method of the present disclosure, the solvent constituting the slurry may be butyl butyrate.

In the method of the present disclosure, the slurry may contain a conductive additive that is constituted of carbon.

In the method of the present disclosure, the slurry may contain a binder.

Advantageous Effects

Addition of a fluorine-based solvent to a slurry containing a solid electrolyte and a cathode active material dissolves dispersion in the slurry, which makes it possible to easily separate the solid electrolyte and the cathode active material using the difference in density, and chemical properties.

DESCRIPTION OF EMBODIMENTS

Figure 1A:
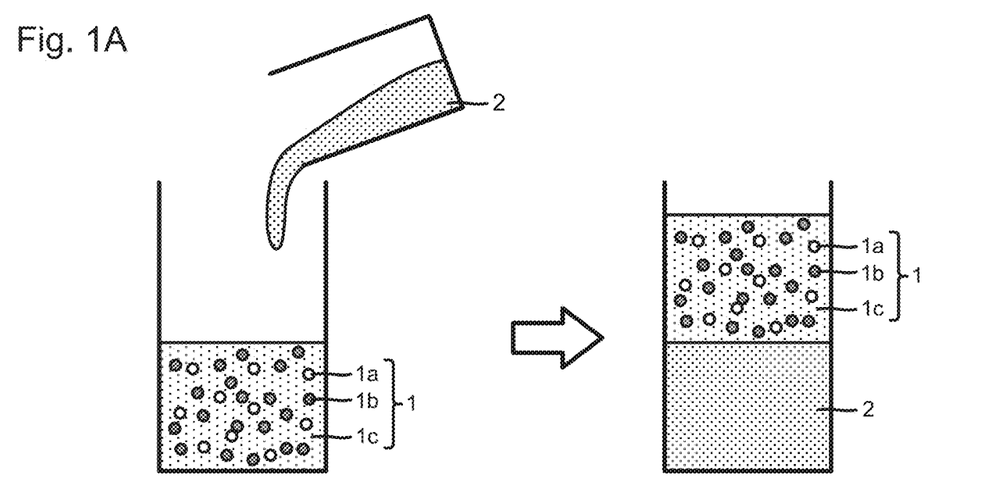
FIGS. 1A and 1B are explanatory schematic views showing one example of a method of separating a cathode active material and a solid electrolyte which are contained in a slurry.
Figure 1B:
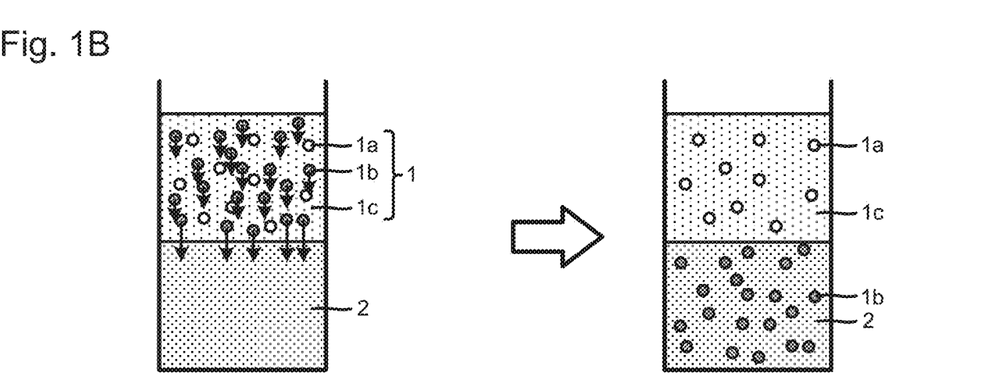
Figure 2A:
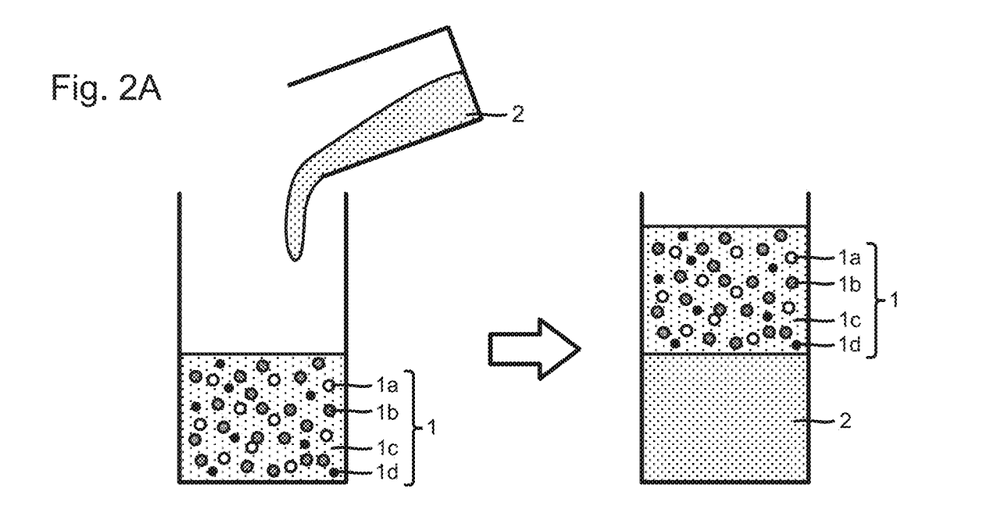
FIGS. 2A and 2B are explanatory schematic views showing one example of a method of separating a cathode active material, a solid electrolyte, and a conductive additive which are contained in a slurry.
Figure 2B:
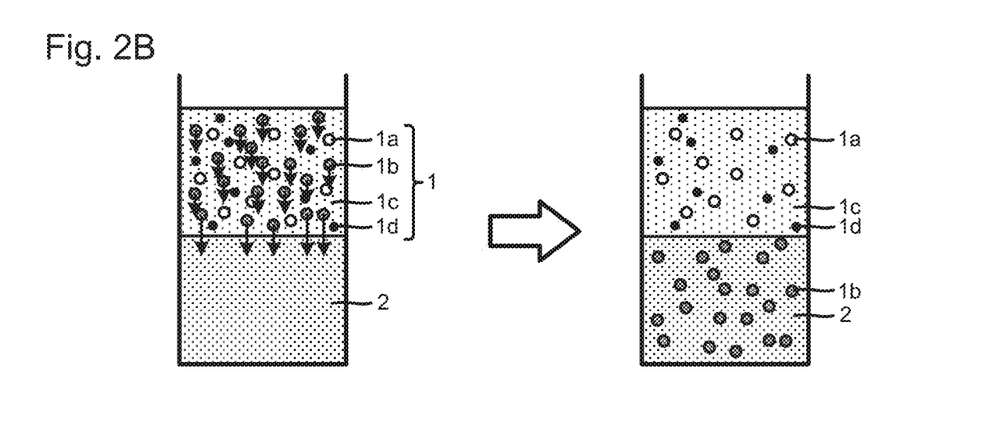

FIGS. 1A and 1B schematically show one example of a method of separating a solid electrolyte and a cathode active material which are contained in a slurry. FIGS. 2A and 2B schematically show one example of a method of separating a cathode active material, a solid electrolyte, and a conductive additive which are contained in a slurry.

As shown in FIG. 1A, the method of the present disclosure includes the step of adding a fluorine-based solvent 2 to a slurry 1 containing a solid electrolyte 1$a$ and a cathode active material 1$b$, the cathode active material 1$b$ containing at least one selected from nickel, cobalt and manganese as a constituent element.

1. Slurry 1

The slurry 1 contains the solid electrolyte 1$a$ and the cathode active material 1$b$. In the slurry 1 shown in FIGS. 1A and 1B, the solid electrolyte 1$a$ and the cathode active material 1$b$ disperse in a solvent 1$c$.

1.1. Solid Electrolyte 1$a$

The solid electrolyte 1$a$ can function as a solid electrolyte in cathodes of batteries. In principle, the effect of the method of the present disclosure is believed to be given independently from the solid electrolyte 1$a$ since the solid electrolyte 1a is a different substance from, and physical and chemical properties thereof are different from the cathode active material 1b. For example, any inorganic solid electrolyte such as a sulfide solid electrolyte, a NASICON type oxide solid electrolyte represented by LATP, and a garnet type oxide solid electrolyte such as LLZ, or any organic solid electrolyte such as a polyelectrolyte represented by PEO may be employed as the solid electrolyte 1a. Particularly, the effect of the method of the present disclosure is further outstanding when the solid electrolyte 1a is a sulfide solid electrolyte. The sulfide solid electrolyte may contain Li and S, and further, may contain P, any halogen, and any element other than them, as a constituent element. Specific examples of the sulfide solid electrolyte include $Li_2S-P_2S_5$, $Li_2S-SiS_2$, $LiI-Li_2S-SiS_2$, $LiI-Si_2S-P_2S_5$, $Li_2S-P_2S_5-LiI-LiBr$, $LiI-Li_2S-P_2S_5$, $LiI-Li_2S-P_2O_5$, $LiI-Li_3PO_4-P_2S_5$, and $Li_2S-P_2S_5-GeS_2$. While sulfide solid electrolytes may react with a substance having a high polarity such as water and water vapour to generate hydrogen sulfide, so as to be handled with care, there is no need to worry about generation of hydrogen sulfide in the method of the present disclosure since, as described later, the fluorine-based solvent 2, which is the carbon fluoride-basis and substantially inactive to sulfide solid electrolytes, is used.

The solid electrolyte 1a may be constituted of only one solid electrolyte, and may be a mixture constituted of two or more solid electrolytes in combination. The solid electrolyte 1a may be crystalline, and may be amorphous. The shape and size of the solid electrolyte 1a are not specifically limited, and ordinary shape and size as a solid electrolyte contained in cathodes of batteries may be employed.

1.2. Cathode Active Material 1b

The cathode active material 1b can contain at least one selected from nickel, cobalt and manganese as a constituent element. Examples thereof include oxides containing lithium, and at least one selected from nickel, cobalt and manganese. More specific examples thereof include at least one selected from lithium cobaltate, lithium nickelate, lithium manganate, lithium nickel cobalt manganese oxides, lithium metal phosphates of $Li_xM_y(PO_4)_z$ where M contains at least one selected from Mn, Co and Ni, and different kind element substituents for some element in any oxide thereof. The cathode active material 1b containing at least one selected from nickel, cobalt and manganese as a constituent element has a higher true density than the solid electrolyte 1a, which makes it possible to further easily separate the solid electrolyte 1a and the cathode active material 1b using the difference in density or the like.

The cathode active material 1b may be constituted of only one active material, and may be a mixture constituted of two or more active materials in combination. The shape and size of the cathode active material 1b are not specifically limited, and ordinary shape and size as a cathode active material contained in cathodes of batteries may be employed. For example, when the cathode active material 1b is in the form of a particle, the particle may be a primary particle, and may be a secondary particle of an agglomeration of the primary particles. In this case, the primary particle size of the cathode active material 1b may be, for example, 1 nm to 100 μm. The lower limit thereof may be at least 5 nm, may be at least 10 nm, and may be at least 50 nm. The upper limit thereof may be at most 50 μm, may be at most 30 μm, and may be at most 15 μm. When the cathode active material 1b is a secondary particle, the secondary particle size may be, for example, 0.5 μm to 100 μm. The lower limit may be at least 1 μm, and the upper limit may be at most 50 μm.

1.3. Solvent 1c

The solvent 1c constituting the slurry 1 may be suitably selected in view of dispersibility of the solid content, reactivity to the solid electrolyte 1a, etc. When the solid electrolyte 1a is a sulfide solid electrolyte, any solvent having a low polarity which does not substantially contain water may be employed as the solvent 1c in view of suppression of the reaction to the sulfide solid electrolyte. For example, the solvent 1c may be butyl butyrate. The solvent 1c may be constituted of only one solvent, and may be a mixture constituted of two or more solvents in combination. As described later, the solvent 1c may have a lower density than the fluorine-based solvent 2. The density of the solvent 1c may be, for example, at least 0.5 g/cm$^3$ and less than 1.0 g/cm$^3$.

1.4. Other Constituents

The slurry 1 may contain any constituent other than the solid electrolyte 1a, the cathode active material 1b and the solvent 1c. For example, as shown in FIGS. 2A and 2B, the slurry 1 may contain a conductive additive 1d in addition to the solid electrolyte 1a and the cathode active material 1b, and may contain a binder (not shown). As shown in FIGS. 2A and 2B, the conductive additive 1d may disperse in the solvent 1c. The binder may dissolve in the solvent 1c, may swell but not dissolve, and may disperse in the solvent 1c as the solid content.

1.4.1. Conductive Additive 1d

The conductive additive 1d can function as a conductive additive in cathodes of batteries. Examples thereof include conductive additives constituted of carbon, and of metals. Examples of the conductive additives constituted of carbon include carbon blacks such as acetylene black, ketjen black, and furnace black, and fibrous carbons such as vapor grown carbon fibers, carbon nanotubes, and carbon nanofibers, or graphite. Examples of the conductive additives constituted of metals include nickel, aluminum, and stainless steel. In the method of the present disclosure, the conductive additive 1d may be a conductive additive constituted of carbon in view of easy separation of the conductive additive 1d and the cathode active material 1b. The conductive additive 1d may be constituted of only one conductive additive, or may be a mixture constituted of two or more conductive additives in combination. The shape and size of the conductive additive 1d are not specifically limited, and ordinary shape and size as a conductive additive contained in cathodes of batteries may be employed. For example, when the conductive additive 1d is in the form of a particle, the particle size thereof may be 5 nm to 1 μm. Or, when the conductive additive 1d is in the form of a fiber, the fiber diameter thereof may be 5 nm to 1 μm, and the aspect ratio thereof may be at least 20.

1.4.2. Binder

The binder can function as a binder in cathodes of batteries. Examples thereof include styrene-butadiene rubber (SBR), carboxymethyl cellulose (CMC), acrylonitrile-butadiene rubber (ABR), butadiene rubber (BR), polyvinylidene fluoride (PVDF), polytetrafluoroethylene (PTFE), and copolymers thereof, or copolymers thereof and other polymerized units. The binder may be constituted of only one, and may be a mixture of at least two in combination.

1.5. Composition of Slurry

The slurry 1 can contain the solid electrolyte 1a and the cathode active material 1b. The content thereof is not specifically limited. For example, the solid electrolyte 1a, the cathode active material 1b, and the conductive additive 1d in total may be 25 volume % to 42 volume % of the slurry 1 when the total volume of the slurry 1 is defined as 100 volume %. When the total mass of the solid electrolyte 1a, the cathode active material 1b, the conductive additive 1d, and the binder is defined as 100 mass %: the content of the cathode active material $1b$ may be 30 mass % to 90 mass %, the lower limit thereof may be at least 50 mass %, and the upper limit thereof may be at most 85 mass %; the content of the solid electrolyte $1a$ may be 5 mass % to 60 mass %, the lower limit thereof may be at least 10 mass %, and the upper limit thereof may be at most 45 mass %; the content of the conductive additive $1d$ may be 0.5 mass % to 30 mass %, the lower limit thereof may be at least 1 mass %, and the upper limit thereof may be at most 10 mass %; and further, the content of the binder may be 0.5 mass % to 30 mass %, the lower limit thereof may be at least 1 mass %, and the upper limit thereof may be at most 10 mass %.

2. Fluorine-Based Solvent

The fluorine-based solvent 2 is a solvent constituted of a compound having a carbon-fluorine bond. The fluorine-based solvent 2 may be either compatible or incompatible with the solvent $1c$. There are advantages to the fluorine-based solvent 2 incompatible with the solvent $1c$ such that (1) a phase of the fluorine-based solvent 2 and a phase of the solvent $1c$ can be easily separated, which makes it further easy to separately collect the fluorine-based solvent 2 and the solvent $1c$ to reuse them, and (2) the separability of the solid electrolyte $1a$ and the cathode active material $1b$ is improved, which makes it further easy to separately collect the solid electrolyte $1a$ and the cathode active material $1b$ to reuse them.

For example, as shown in FIGS. 1A and 2A, the phase of the solvent $1c$ constituting the slurry 1, and the phase of the fluorine-based solvent 2 may be separated from each other, and the phase of the solvent $1c$ constituting the slurry 1 may be on the top side of the phase of the fluorine-based solvent 2 in a stationary state. That is, the fluorine-based solvent 2 may have a higher density than the solvent $1c$. The density of the fluorine-based solvent 2 may be, for example, 1.4 g/cm$^3$ to 2.0 g/cm$^3$. In this case, as shown in FIGS. 1B and 2B, the solid electrolyte $1a$ and the conductive additive $1d$ tend to remain on the solvent $1c$ side, and the cathode active material $1b$ tends to move to the fluorine-based solvent 2 side due to the difference in density between the solid electrolyte $1a$, the cathode active material $1b$, and the conductive additive $1d$ etc.

The fluorine-based solvent 2 may either have or not have any element other than carbon and fluorine, such as hydrogen, and heteroelements other than fluorine. According to findings of the inventor of the present disclosure, when the fluorine-based solvent 2 does not have a hydrocarbon group, the compatibility of the fluorine-based solvent 2 with the solvent $1c$ may be lowered, which makes it easy to separate the fluorine-based solvent 2 from the solvent $1c$. Particularly, when the fluorine-based solvent 2 is a perfluoroalkane that is a perfluorinated hydrocarbon, the phase of the fluorine-based solvent 2 and the phase of the solvent $1c$ are apparently separated, which makes it easy to have the foregoing advantages. A perfluoroalkane that may be employed for the fluorine-based solvent 2 can have a carbon number such that the perfluoroalkane may be present in the form of liquid during work. For example, a perfluoroalkane having a carbon number of 4 to 16 may be employed.

Figure 3A:
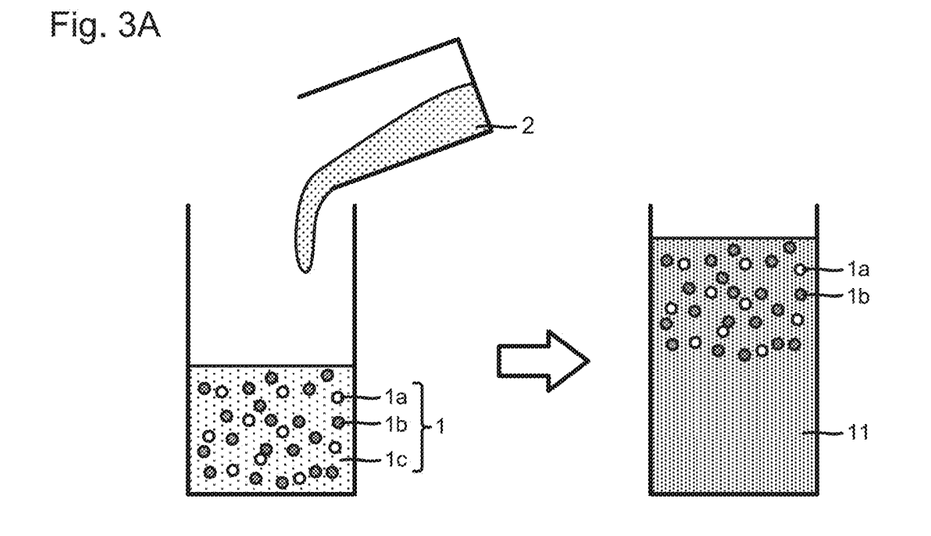
FIGS. 3A and 3B are explanatory schematic views showing another example of the method of separating a cathode active material and a solid electrolyte which are contained in a slurry.
Figure 3B:
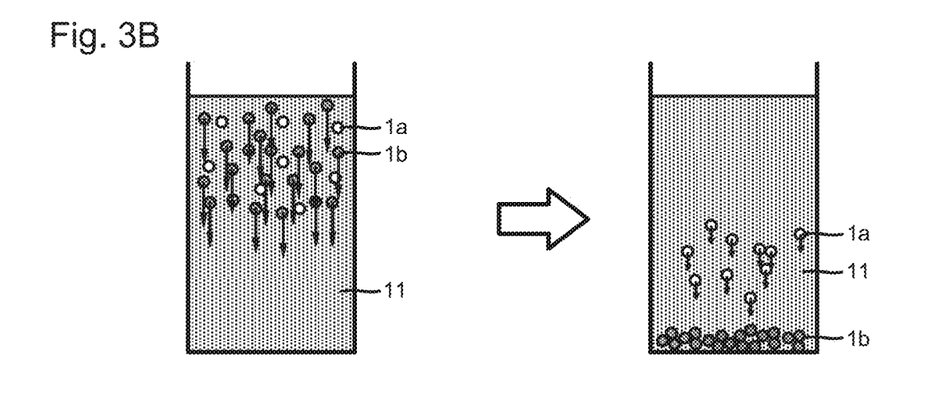

It is believed that the solid electrolyte $1a$ and the cathode active material $1b$ may be separated using the difference in density etc. as well when the fluorine-based solvent 2 is compatible with the solvent $1c$. For example, as shown in FIGS. 3A and 3B, even if the solvent $1c$ and the fluorine-based solvent 2 are compatible so as to be a mixed solution 11 when the fluorine-based solvent 2 is added to the slurry 1 (FIG. 3A), the dispersion of the constituents of the slurry is dissolved in the mixed solution 11, and the cathode active material $1b$, which has a high density, precipitates in advance. That is, the solid electrolyte $1a$ can be concentrated on the upper side, and the cathode active material $1b$ can be concentrated on the lower side in a sedimentary layer after the precipitation (FIG. 3B). In this case, operation such as distillation is necessary for separating the solvent $1c$ and the fluorine-based solvent 2 to reuse the solvent $1c$ and the fluorine-based solvent 2.

The amount of the fluorine-based solvent 2 added to the slurry 1 may be such an extent that the solid electrolyte $1a$ and the cathode active material $1b$ can be separated. For example, the volume of the fluorine-based solvent 2 that is 1 to 5 times as large as the solvent $1c$ constituting the slurry 1 may be added.

The way of adding the fluorine-based solvent 2 to the slurry 1 is not specifically limited. As shown in FIGS. 1A to 3B, one may store the slurry 1 in a vessel, and pour the fluorine-based solvent 2 into the vessel. Or, one may store the fluorine-based solvent 2 in a vessel, and pour the slurry 1 into the vessel. The fluorine-based solvent 2 may be added to the slurry 1 by any other way. Mixing or stirring may be performed after the fluorine-based solvent 2 is added to the slurry 1 in view of rapid dissolution of the dispersion in the slurry 1.

3. Operation and Effect

Generally, the slurry 1 is made by crushing by an ultrasonic wave or the like, or by means of a kneading machine. Thus, the constituents in the slurry 1 disperse in the form of a fine particle, which may cause the constituents of the slurry to precipitate as they disperse even after they stand still for a long time. In this regard, some process is necessary for separating the solid electrolyte $1a$ and the cathode active material $1b$ in the slurry 1. According to new findings of the inventor of the present disclosure, as described above, addition of the fluorine-based solvent 2 to the slurry 1 dissolves the dispersion in the slurry 1, makes it possible to aggregate the cathode active material $1b$, and makes it possible to separate the solid electrolyte $1a$ and the cathode active material $1b$ using the difference in density etc. Particularly, as shown in FIGS. 1A to 2B, when the fluorine-based solvent 2 that has no compatibility with the solvent $1c$ constituting the slurry 1 is used, the cathode active material $1b$ may be separated on the fluorine-based solvent 2 side as the solid electrolyte $1a$ remains on the solvent $1c$ side. In the method of the present disclosure, the solid electrolyte $1a$ precipitates at the bottom in the solvent $1c$ since the dispersion dissolves, and is isolated from a water-containing environment such as the atmosphere, which do not cause the trouble of generation of hydrogen sulfide so much at once even when a sulfide solid electrolyte is used as the solid electrolyte $1a$.

EXAMPLES

The technique of the present disclosure will be hereinafter described in more detail with reference to Examples, but is not limited to the following Examples.

1. Study of Fluorine-Based Solvents

Compatibility of three fluorine-based solvents A to C shown in the following Table 1 with butyl butyrate that is a solvent employed for a cathode slurry for all-solid-state batteries was confirmed. Specifically, 6 g of butyl butyrate was added to 45 g of each fluorine-based solvent to be mixed, and after the state of the mixed solution was stable, whether phases thereof were separated or not was visually confirmed. The results are shown in FIGS. 4A to 4C.

TABLE 1

| | fluorine-based solvent A | fluorine-based solvent B | fluorine-based solvent C |
|---|---|---|---|
| boiling point (° C.) | 128 | 115 | 76 |
| density (g/cm$^3$) | 1.83 | 1.56 | 1.43 |
| chemical formula | C9F20 | C6F13—C2H5 | C4F9—O—C2H5 |
| product name etc. | Fluorinert FC3283 by 3M | ASAHIKLIN AC6000 by AGC | Novec7200 by 3M |

Figure 4A:
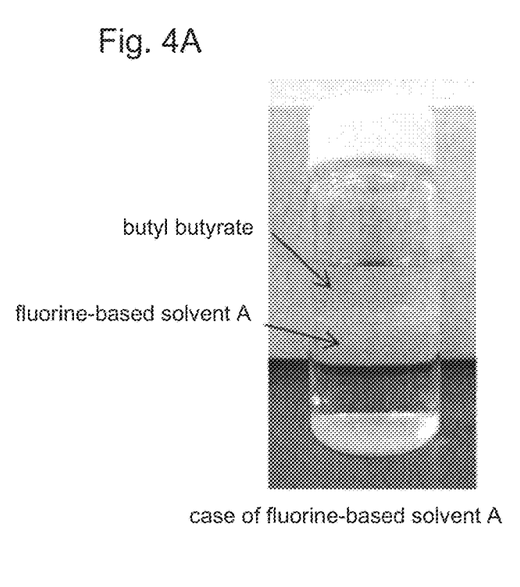
FIGS. 4A to 4C are photographs showing fluorine-based solvents A to C being compatible with butyl butyrate.
Figure 4B:
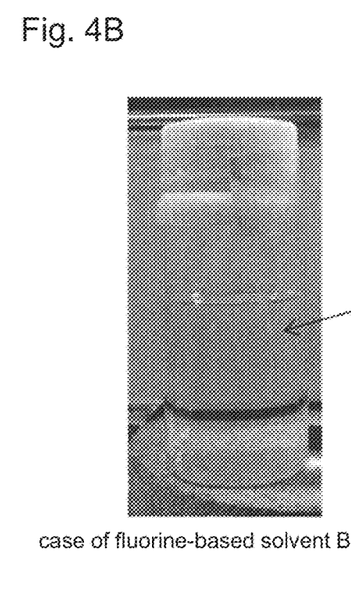
Figure 4C:
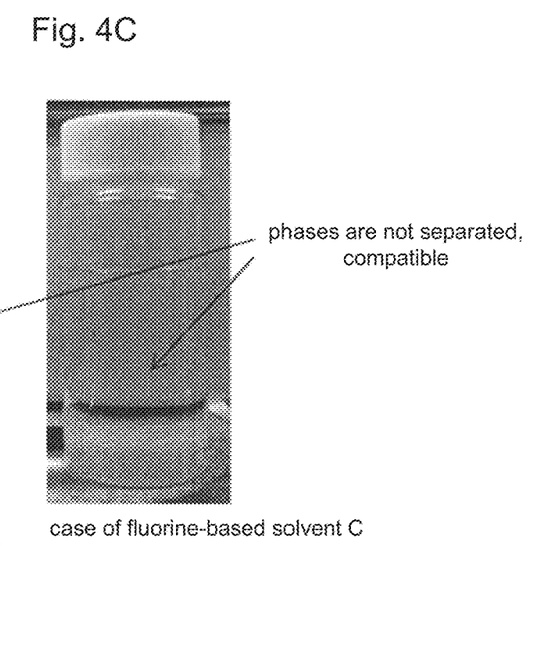

As shown in FIG. 4A, the fluorine-based solvent A was not compatible with butyl butyrate, and their phases apparently separated such that the phase of butyl butyrate was on the top side, and the phase of the fluorine-based solvent A was on the bottom side. It is believed that the fluorine-based solvent A did not have affinity at all for butyl butyrate, which is an organic solvent, and thus was not compatible with butyl butyrate since being fully fluorinated and not having a hydrocarbon group. In contrast, as shown in FIGS. 4B and 4C, the fluorine-based solvents B and C were compatible with butyl butyrate, and became uniform solutions. Hydrocarbon groups terminating the fluorine-based solvents B and C are believed to have improved compatibility with butyl butyrate. From the foregoing results, a fluorine-based solvent having no hydrocarbon group, especially a perfluoroalkane that is a perfluorinated hydrocarbon is preferably employed for a fluorine-based solvent in view of reusability or the like.

2. Experiments of Mixing Constituents of Slurry and Fluorine-based Solvent A

One or two constituents that may be contained in a slurry for coating cathodes of all-solid-state batteries, such as a cathode active material, a solid electrolyte, a conductive additive, and a binder were dispersed in butyl butyrate to make a slurry, the fluorine-based solvent A was added to the slurry to be mixed, and thereafter the state after mixed was visually confirmed.

2.1. Slurry I

Figure 5A:
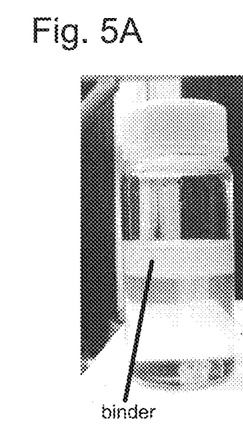
FIGS. 5A to 5F are photographs each showing one example of a state after the fluorine-based solvent A was added to a slurry containing constituents.

A polyvinylidene fluoride (PVdF)-based binder was dispersed and partially dissolved in butyl butyrate as a binder, to obtain a slurry I for evaluation, so that 10 mass % of the binder was contained in the slurry I. To the obtained slurry I, 45 g of the fluorine-based solvent A, the volume of which was approximately 3.5 times as large as butyl butyrate, was added to be mixed, and thereafter the state of the binder in the mixed solvent was confirmed. The results are shown in FIG. 5A.

2.2. Making Slurry II

Figure 5B:
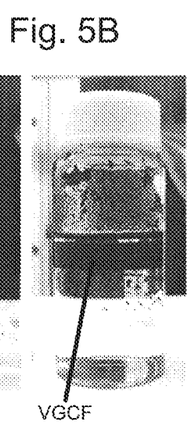

As a conductive additive, 0.1 g of a vapor grown carbon fiber (VGCF) was dispersed in 6 g of butyl butyrate, to obtain a slurry II for evaluation. To the obtained slurry II, 45 g of the fluorine-based solvent A, the volume of which was approximately 3.5 times as large as butyl butyrate, was added to be mixed, and thereafter the state of VGCF in the mixed solvent was confirmed. The results are shown in FIG. 5B.

2.3. Making Slurry III

Figure 5C:
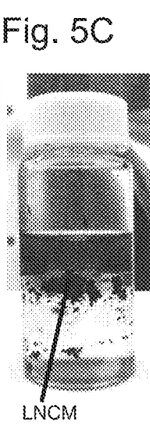

In 6 g of butyl butyrate, 1.5 g of a lithium nickel cobalt manganese oxide (LNCM) was dispersed to obtain a slurry III for evaluation. To the obtained slurry III, 45 g of the fluorine-based solvent A, the volume of which was approximately 3.5 times as large as butyl butyrate, was added to be mixed, and thereafter the state of LNCM in the mixed solvent was confirmed. The results are shown in FIG. 5C.

2.4. Making Slurry IV

Figure 5D:
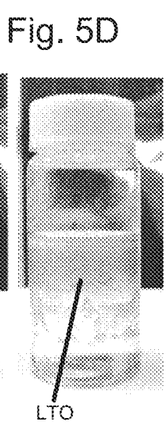

In 6 g of butyl butyrate, 1.5 g of lithium titanate (LTO) was dispersed to obtain a slurry IV for evaluation. To the obtained slurry IV, 45 g of the fluorine-based solvent A, the volume of which was approximately 3.5 times as large as butyl butyrate, was added to be mixed, and thereafter the state of LTO in the mixed solvent was confirmed. The results are shown in FIG. 5D.

2.5. Making Slurry V

Figure 5E:
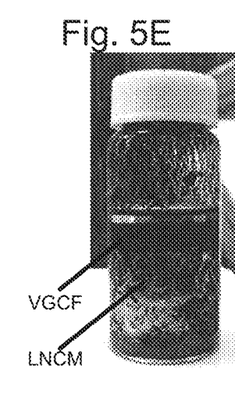

In 6 g of butyl butyrate, 1.5 g of LNCM and 0.05 g of VGCF were dispersed to obtain a slurry V for evaluation. To the obtained slurry V, 45 g of the fluorine-based solvent A, the volume of which was approximately 3.5 times as large as butyl butyrate, was added to be mixed, and thereafter the state of LNCM and VGCF in the mixed solvent was confirmed. The results are shown in FIG. 5E.

2.6. Making Slurry VI

In 6 g of butyl butyrate, 1.5 g of a $Li_2S$—$P_2S_5$—based sulfide solid electrolyte was dispersed to obtain a slurry VI for evaluation. To the obtained slurry VI, 45 g of the fluorine-based solvent A, the volume of which was approximately 3.5 times as large as butyl butyrate, was added to be mixed, and thereafter the state of the sulfide solid electrolyte in the mixed solvent was confirmed. The results are shown in FIG. 5F.

2.7. Evaluation Results

The common feature in FIGS. 5A to 5F is an apparent boundary between a phase of butyl butyrate and the phase of the fluorine-based solvent. That is, the phase of the fluorine-based solvent can be easily collected by suction or the like.

Figure 5F:
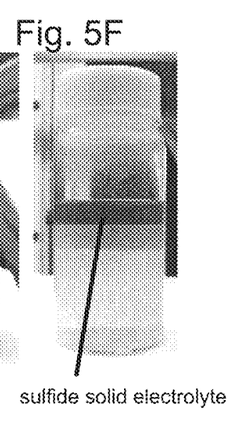

As shown in FIG. 5A, the binder remains in the phase of butyl butyrate even if the fluorine-based solvent A was added to the slurry I, which is the same as the slurry II shown in FIG. 5B, and the slurry VI shown in FIG. 5F. In FIG. 5F, the phase of butyl butyrate discolors by elution of a lithium halide. In any of FIGS. 5A, 5B and 5F, the phase of the fluorine-based solvent is transparent and the binder, the conductive additive, and the solid electrolyte do not move into the phase of the fluorine-based solvent, excluding attachment to the wall face of the vessel.

In contrast, as shown in FIGS. 5C and 5D, when the fluorine-based solvent A was added to each of the slurries III and IV containing the cathode active material, the cathode active material moved into the phase of the fluorine-based solvent, which was on the lower phase side. Particularly, much of LNCM moved into the phase of the fluorine-based solvent in the slurry III where LNCM was dispersed.

In FIG. 5E, a black substance is present in both the phase of butyl butyrate and the phase of the fluorine-based solvent. It is believed from the results of FIGS. 5B and 5C that VGCF remained in the phase of butyl butyrate, and LNCM moved into the phase of the fluorine-based solvent although LNCM and VGCF were both black and thus visual determination was difficult.

While the true density of both VGCF and the solid electrolyte is approximately 2 g/cm$^3$, the true density of LNCM is approximately 4.7 g/cm$^3$. The density of butyl butyrate is approximately 0.87 g/cm$^3$. Further, in the comparison of the surface tensions of the solvents, the fluorine-based solvent A has a surface tension of approximately 16 mN/m, and butyl butyrate has a surface tension of approximately 20 to 25 mN/m. With the foregoing in view, a substance present around the boundary between the phase of butyl butyrate and the phase of the fluorine-based solvent tends to be pulled into the phase of butyl butyrate. It is believed that from the results shown in FIGS. 5A to 5F, while VGCF and the solid electrolyte, which had a low density in the same degree, were pulled into the phase of butyl butyrate to remain, LNCM, which had a high density, exceeded the surface tension to precipitate on the side of the phase of the fluorine-based solvent.

3. Experiment of Mixing Slurry and Fluorine-based Solvent A

A lithium nickel cobalt manganese oxide as a cathode active material, a $Li_2S$—$P_2S_5$—based sulfide solid electrolyte as a solid electrolyte, VGCF as a conductive additive, and PVdF as a binder were each weighed so as to have a mass ratio of approximately: cathode active material:solid electrolyte:conductive additive:binder=84.6:13.4:1.3:0.7, to be added into butyl butyrate, to be dispersed for 6 minutes by means of an ultrasonic homogenizer (power: 50 W), to obtain a slurry for coating cathodes. To the obtained slurry for coating cathodes, 45 g of the fluorine-based solvent A, the volume of which was approximately 3.5 times as large as butyl butyrate, was added to be mixed, and thereafter the state of each constituent in the mixed solvent was confirmed. The results are shown in FIG. 6.

Figure 6:
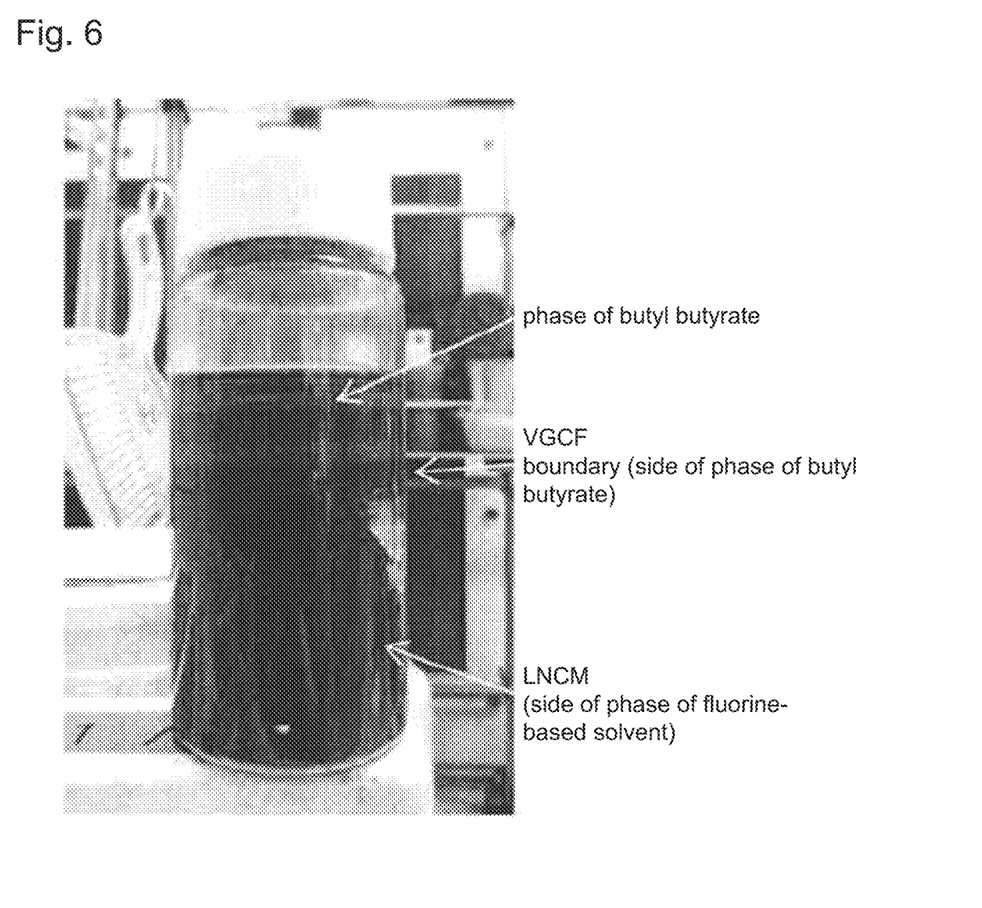
FIG. 6 is a photograph showing one example of a state after the fluorine-based solvent A was added to a slurry containing a solid electrolyte, a cathode active material, and a conductive additive.

As shown in FIG. 6, a black cathode active material is present in the phase of the fluorine-based solvent while attaching to the wall face a lot, and a portion other than a portion where the cathode active material is present is substantially transparent. VGCF sediments on the side of the phase of butyl butyrate in a boundary part of the phase of butyl butyrate and the phase of the fluorine-based solvent. The sulfide solid electrolyte is also present in the side of the phase of butyl butyrate.

The slurry for coating cathodes was an black uniform slurry before mixed with the fluorine-based solvent, but the dispersion of the cathode active material dissolved, agglomeration of the cathode active material occurred, and the cathode active material rapidly sedimented after the slurry was mixed with the fluorine-based solvent. It is believed to be because the fluorine-based solvent having bad wettability was temporarily substituted for butyl butyrate on the surface of the cathode active material.

As described above, it is found that addition of a fluorine-based solvent to a slurry containing a solid electrolyte and a cathode active material makes it possible to separate the solid electrolyte and the cathode active material. It is believed that when being separated, a phase of the slurry and a phase of the fluorine-based solvent may be easily separated and collected by suction etc., which makes it easy to reuse the slurry solvent and the fluorine-based solvent. It is also believed that movement of the cathode active material into the phase of the fluorine-based solvent makes it easy to recycle valuable substances such as nickel, cobalt, and manganese.

4. Supplements

The foregoing Examples showed the mode of using a sulfide solid electrolyte as a solid electrolyte. The technique of the present disclosure is not limitedly applied to this mode. In principle, the effect of the method of the present disclosure is believed to be given independently from a solid electrolyte since a solid electrolyte is a different substance from, and physical and chemical properties thereof are different from a cathode active material.

The foregoing Examples showed the mode of using LNCM as a cathode active material. The technique of the present disclosure is not limitedly applied to this mode. It is apparent that the same effect is given by any cathode active material containing at least one of nickel, cobalt and manganese.

The foregoing Examples showed the mode of using butyl butyrate as a solvent constituting a slurry. The technique of the present disclosure is not limitedly applied to this mode.

A similar effect is believed to be given even when any organic solvent other than butyl butyrate is used. It is hardly considered to employ water for a solvent constituting a slurry in view of reactivity to a solid electrolyte etc. Particularly, it is apparently impossible to employ water for a solvent constituting a slurry when a sulfide solid electrolyte is employed for a solid electrolyte. It is ideal to employ a solvent having a low polarity which does not substantially contain water, for example, butyl butyrate as a solvent constituting a slurry in view of reactivity to a solid electrolyte etc. It is however believed that a solid electrolyte and a cathode active material may be separated by the method of the present disclosure using a fluorine-based solvent in principle even if water is employed for a solvent constituting a slurry.

Figure 7:
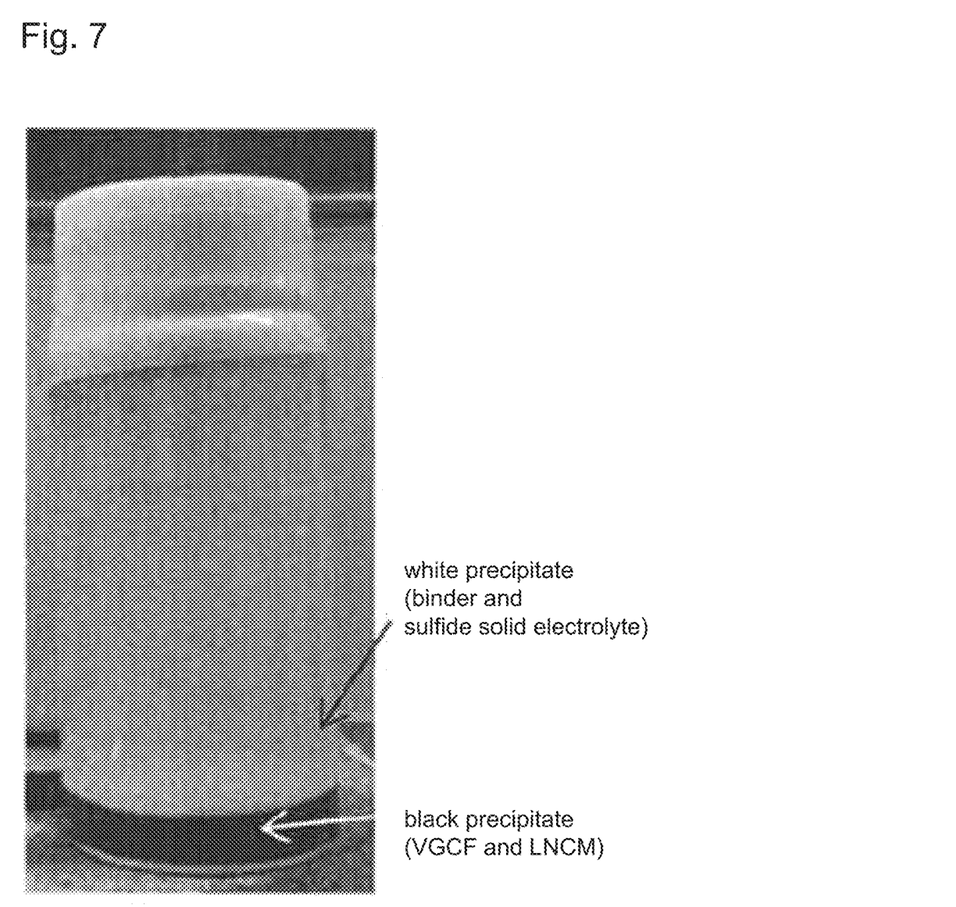
FIG. 7 is a photograph showing one example of a state after the fluorine-based solvent B was added to a slurry containing a solid electrolyte, a cathode active material, and a conductive additive.

The foregoing Examples showed the mode such that a fluorine-based solvent was incompatible with, and separated from a solvent constituting a slurry. The technique of the present disclosure is not limitedly applied to this mode. FIG. 7 shows the result of a similar experiment using the fluorine-based solvent B instead of the fluorine-based solvent A. As shown in FIG. 7, the fluorine-based solvent B was compatible with butyl butyrate, to be a uniform mixed solution. In this case, the dispersion of the whole of the constituents of the slurry was dissolved, and the whole of the constituents of the slurry precipitated in the mixed solution. Here, the cathode active material, which had a highest true density, precipitated or sedimented first since there was the difference in density between the solid electrolyte, the cathode active material, and the conductive additive. That is, it is believed that the cathode active material was present on the lower layer side of precipitates or sediments, and extraction only on the lower layer side makes it possible to efficiently collect the cathode active material. It is believed that this can be applied to a limited environment since distillation of the mixed solution or the like is necessary when the fluorine-based solvent is reused, which necessitates much energy for reusing the fluorine-based solvent.

INDUSTRIAL APPLICABILITY

The technique of the present disclosure is preferably used as, for example, a technique for recycling a solid electrolyte and a cathode active material which are contained in a slurry for coating cathodes of all-solid-state batteries.

REFERENCE SIGN LIST 1 slurry
1*a* solid electrolyte
1*b* cathode active material
1*c* solvent
1*d* conductive additive
2 fluorine-based solvent
11 mixed solution

What is claimed is:

1. A method of separating a solid electrolyte and a cathode active material which are contained in a slurry, the method comprising:
adding a fluorine-based solvent having a carbon number of 4 to 16 to the slurry containing the solid electrolyte and the cathode active material, the cathode active material containing at least one selected from nickel, cobalt and manganese as a constituent element.

2. The method according to claim 1, wherein the fluorine-based solvent does not have a hydrocarbon group.

3. The method according to claim 1, wherein the fluorine-based solvent is a perfluoroalkane.

4. The method according to claim 1, wherein the solid electrolyte is a sulfide solid electrolyte.

5. The method according to claim 1, wherein
- a phase of a solvent constituting the slurry and a phase of the fluorine-based solvent are separated from each other, and
- the phase of the solvent constituting the slurry is on a top side of the phase of the fluorine-based solvent in a stationary state.

6. The method according to claim 1, wherein the solvent constituting the slurry is butyl butyrate.

7. The method according to claim 1, wherein the slurry contains a conductive additive that is constituted of carbon.

8. The method according to claim 1, wherein the slurry contains a binder.

* * * * *